(12) United States Patent  
Fallis, III et al.

(10) Patent No.: US 7,621,583 B2  
(45) Date of Patent: Nov. 24, 2009

(54) RETRACTABLE HARDTOP WITH EXTENDED BUTTRESSES AND AN ACTIVE REAR WINDOW

(75) Inventors: Robert E. Fallis, III, Rochester, MI (US); Michael T. Willard, Harristown Township, MI (US); Robert D. Wiechowski, Warren, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 59 days.

(21) Appl. No.: 12/131,440

(22) Filed: Jun. 2, 2008

(65) Prior Publication Data

US 2008/0296925 A1 Dec. 4, 2008

Related U.S. Application Data

(60) Provisional application No. 60/941,105, filed on May 31, 2007.

(51) Int. Cl.
*B60J 7/14* (2006.01)
*B60J 7/20* (2006.01)
(52) U.S. Cl. .................. 296/108; 296/107.08
(58) Field of Classification Search ................. 296/108, 296/107.08
See application file for complete search history.

(56) References Cited

U.S. PATENT DOCUMENTS

| 6,142,555 | A | 11/2000 | Huber |
| 6,149,223 | A | 11/2000 | Baessler et al. |
| 6,322,131 | B1 | 11/2001 | Maass et al. |
| 6,431,637 | B2 | 8/2002 | Maass |
| 6,582,009 | B2 | 6/2003 | Wezyk et al. |
| 6,866,324 | B2 * | 3/2005 | Neubrand et al. ........... 296/108 |
| 7,172,236 | B1 * | 2/2007 | Chevtsov et al. ....... 296/107.17 |
| 2002/0149229 | A1 | 10/2002 | Wezyk et al. |
| 2004/0119315 | A1 | 6/2004 | Huedepohl |
| 2005/0218690 | A1 | 10/2005 | Schuett et al. |
| 2006/0131921 | A1 | 6/2006 | Harrison, III |

* cited by examiner

*Primary Examiner*—Dennis H Pedder
(74) *Attorney, Agent, or Firm*—Brooks Kushman P.C.

(57) ABSTRACT

A retractable hardtop for a vehicle is disclosed that includes a unitary roof panel, an active rear window and a four bar link. The four bar link includes a pair of buttress panels and a pair of rear rails that are connected to the roof panel and the vehicle. No structural members of the retractable hard top interconnect the lower portion of the buttress panels or the rear rails between the pivot connections to the roof and the pivot connections to the vehicle.

20 Claims, 5 Drawing Sheets

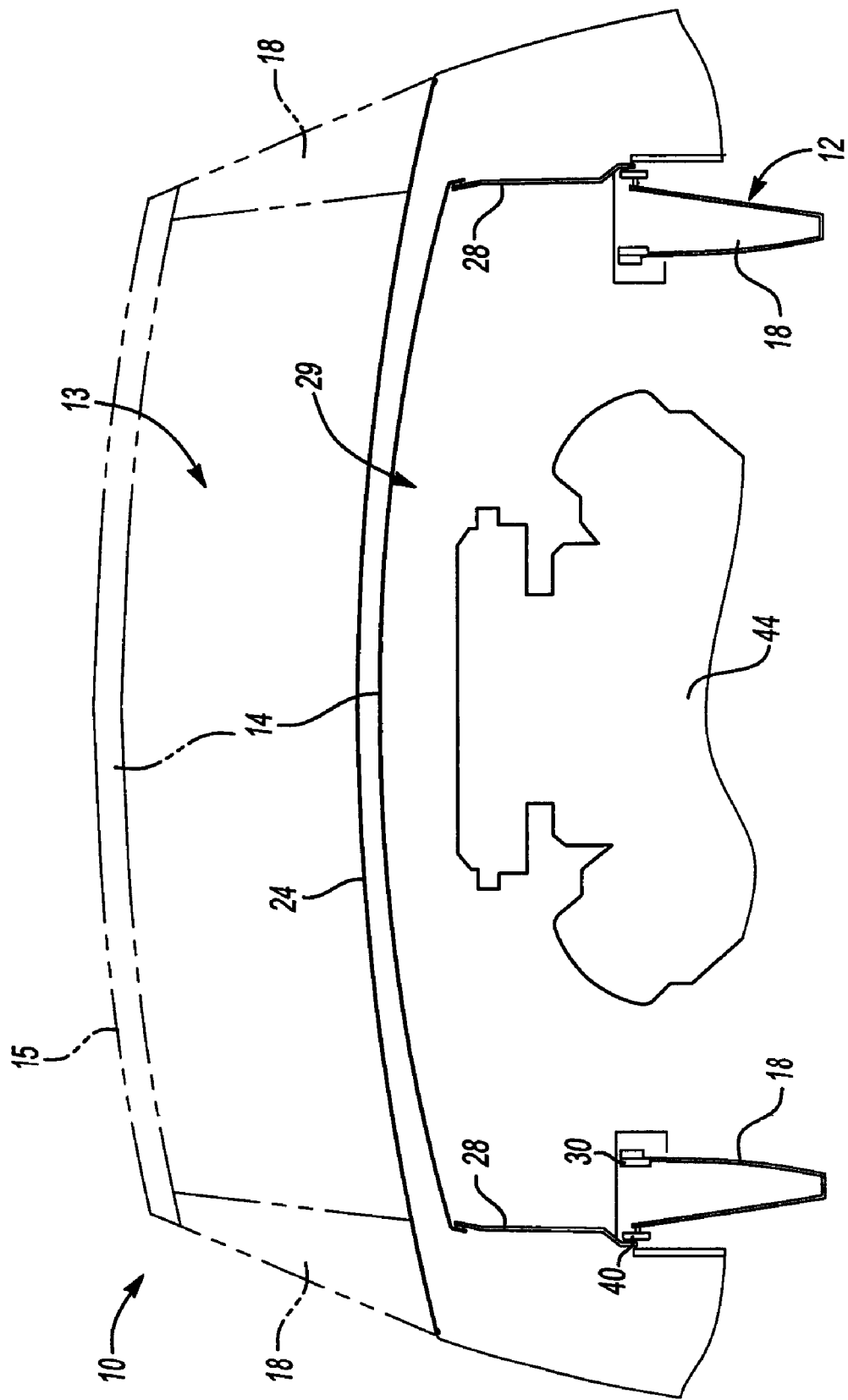

RETRACTABLE HARDTOP WITH EXTENDED BUTTRESSES AND AN ACTIVE REAR WINDOW

CROSS-REFERENCE TO RELATED APPLICATIONS

This application claims the benefit of U.S. provisional application Ser. No. 60/941,105 filed May 31, 2007.

BACKGROUND OF THE INVENTION

1. Field of the Invention

The present invention relates to retractable hardtops for vehicles that have extended buttresses extending rearwardly from opposite sides of an active rear window.

2. Background Art

Retractable hardtops are the preferred type of convertible top for luxury vehicles. Retractable hardtops provide the appearance of a hardtop coupe or sedan because they are made with rigid panels. The rigid panels of the retractable hardtop are retractable on a linkage that permits the panels to fold into a storage compartment. In many instances, the storage compartment is located below a tonneau or rear-pivoting decklid that provides access to a storage area or a part of the trunk located behind the passenger compartment.

Popular styling queues for sports cars may include extended buttresses on opposite sides of a rear window of a vehicle that provide a "fast back" appearance for the vehicle. Elongated buttress panels that extend a substantial distance behind the rear window of the vehicle are difficult to store in a rear stowage compartment or under the decklid of a vehicle due to the length of the links and rearward extent of the links.

Mid-engine vehicles are difficult to equip with a convertible top or a retractable hardtop because the engine location limits potential storage space. The normal location for storing a retractable hardtop or convertible top is immediately behind the last row of seats in a storage compartment. With a mid-engine vehicle, the engine interferes with storage of the hardtop panels or roof bows.

In the manufacture of retractable hardtop vehicles, it is important to provide a simple kinemat that minimizes the number of parts and provides a compactly stowed retractable hardtop.

Applicants' invention is directed to solving one or more of the above problems as summarized below.

SUMMARY OF THE INVENTION

A retractable hardtop is provided for a vehicle having a rear pivot decklid. The decklid has a pair of slots that provide clearance for movement relative to a pair of extended buttress panels. The retractable hardtop includes a unitary roof panel that spans a passenger compartment of the vehicle and extends longitudinally from a windshield header to a rear window and transversely across the vehicle. A pair of buttress panels extend through the clearance slots of the decklid and are provided on opposite sides of the roof panel. Each buttress panel is pivotally attached to the vehicle on a lower end of the buttress panel. A pair of buttress-to-roof links are pivotally attached to the roof panel. A pair of rear rails are provided on opposite sides of the roof panel. The rear rails are pivotally connected to the vehicle on their lower ends at a location that is spaced from the point at which the buttress panel is attached to the vehicle. The rear rails are pivotally attached on an upper end at the same location that the buttress-to-roof link is attached to the roof panel. The rear window is shifted between a closed position and an open position. In the closed position, the window extends from the roof downwardly to the vehicle. In the open position, the rear window is retracted downwardly into the vehicle. As the decklid is raised, the clearance slots allow the decklid to move from a position adjacent to the bottom of the buttress panels to a position in which the decklid is disposed above the buttress panels. The buttress panels are pivoted about the lower ends thereof rearwardly to an inverted position and the roof panel is pivoted relative to the upper end of the buttress panels to a storage position extending between and above the buttress panels.

According to another aspect of the invention, a retractable hardtop system is provided for a vehicle that comprises a one-piece roof panel, an active rear window, and a pair of four bar linkages disposed on opposite lateral sides of the vehicle. The one-piece roof panel has a top side. The active rear window engages the roof panel in the closed position and is retracted into the vehicle in an open position. The pair of four bar linkages include right and left buttress panels, right and left rear rails, right and left buttress-to-roof links, a main pivot bracket and a rear rail pivot bracket. The four bar linkages move the roof panel between an extended position and a stored position. The buttress panels and the rear rails are inverted as they move between the extended and retracted positions and the top side of the roof panel remains in the same top side up orientation as the top is moved between the extended and retracted positions.

According to yet another aspect of the invention, a retractable hardtop is provided for a vehicle. The retractable hardtop comprises a roof panel spanning a passenger compartment of the vehicle and extending longitudinally from a windshield header to a rear window and transversely across the vehicle. A pair of buttress panels are pivotally connected to opposite sides of the roof panel. Each buttress panel is pivotally attached to the vehicle at a lower end. The pair of buttress panels are not interconnected along the lower portion of the buttress panels to the location where the buttress panels are attached to the vehicle. A pair of rear rails are provided on opposite sides of the roof panel. Each rear rail is pivotally connected to the vehicle at a lower end at a location that is spaced from the point at which the buttress panel is attached to the rear vehicle. Each rear rail is also pivotally attached on an upper end to the roof panel. A rear window may be shifted from a closed position in which the window extends from the roof downwardly to the vehicle and an open position in which the rear window is retracted downwardly into the vehicle. Clearance is provided between the buttress panels and below the roof panel in the stored position. The lack of any interconnecting structure between the lower portions of the buttress panels to the location where the buttress panels are attached to the vehicle reduces the vertical space required for storing the retractable hardtop below the roof panel to the thickness of the roof panel.

These and other aspects of the disclosed invention will be better understood in view of the attached drawings and following detailed description of the illustrated embodiment.

BRIEF DESCRIPTION OF THE DRAWINGS

FIG. 7 is a fragmentary diagrammatic rear elevation view of the embodiment of the retractable hardtop shown in FIG. 3 in the fully retracted position.

DETAILED DESCRIPTION OF THE ILLUSTRATED EMBODIMENT(S)

Figure 1:
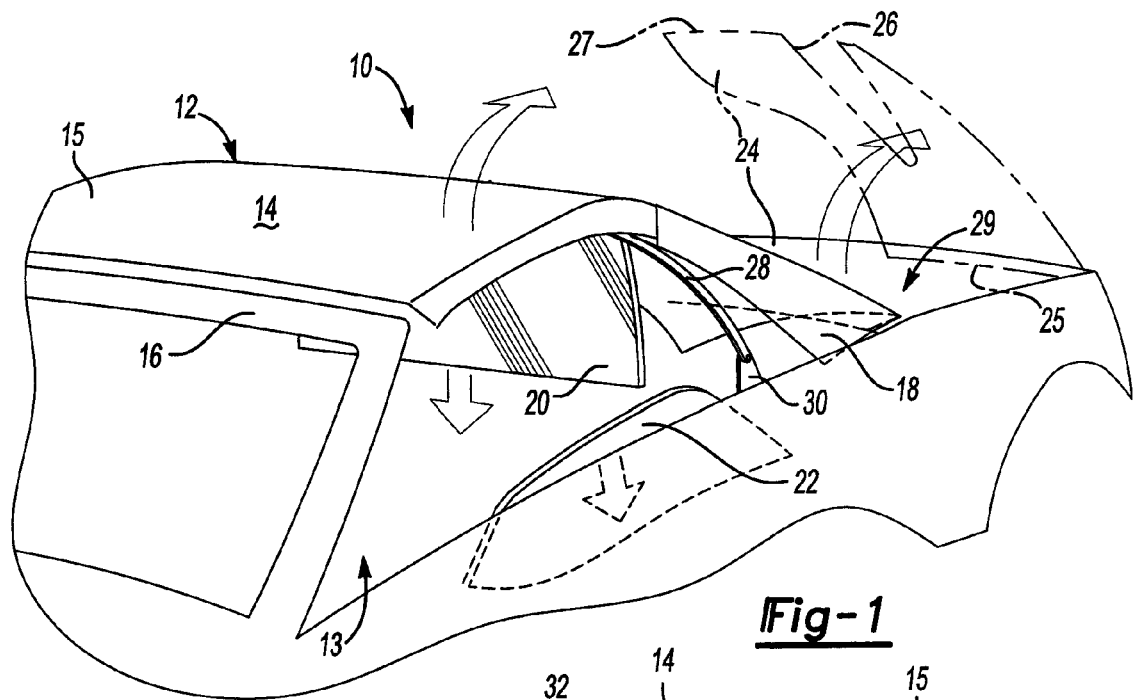
FIG. 1 is a fragmentary front side perspective view of a vehicle having a retractable hardtop with extended buttresses and an active rear window.

Referring to FIG. 1, a vehicle 10 is shown that has a retractable hardtop assembly 12 that covers a passenger compartment 13 of the vehicle 10. The retractable hardtop assembly 12 includes a main roof panel 14 that is a one-piece panel having a top side 15. The retractable hardtop assembly 12 extends from the windshield header 16 to a pair of buttress panels 18 on opposite lateral sides of the main roof panel 14. Only one buttress panel 18 is shown in FIG. 1, but it should be understood that a mirror image of buttress panel 18 is provided on the right side of the vehicle. The buttress panels 18 extend rearwardly and downwardly from the main roof panel 14. The buttress panels 18 are elongated parts that are connected by intervening structure at the lower portion but are pivotally connected to the vehicle at their lower distal ends. The lower portion of the buttress panels 18 as used herein is the lower 75% of the length of the buttress panels 18. The buttress panels 18 are pivotally attached to the vehicle as will be described below. The vehicle 10 is not to be interpreted as intervening structure of the retractable hard top assembly 12 as used herein because it is not part of the retractable hardtop assembly 12.

An active rear window 20 may be separately provided that is raised and lowered independently of the retractable hardtop assembly 12. The active rear window 20 is preferably supported on a window regulator that may be provided with a power operating mechanism, as is well known in the art relating to vehicle windows. The rear window 20, as illustrated, engages the roof panel 14 when closed but, alternatively could engage a bar, rail or other structure that is connected between the buttress panels immediately below or adjacent the juncture of the buttress panels and the roof panel 14.

The retractable hardtop assembly 12 comprising the main roof panel 14, buttress panels 18, and kinematic links may be provided in a single module. The retractable hardtop assembly 10 may be provided with a power drive in which hydraulic cylinders or another type of motor is operatively connected to the roof kinemat. The active rear window 20 and its associated regulator and housing (not shown) may be provided as a second module.

A side window 22 is also shown partially lowered into the vehicle 10 and preferably into the door of the vehicle 10. The side window is raised and lowered on a window regulator mechanism that may be power or manual.

A rear decklid 24 is shown in FIG. 1 with an arrow indicating that the rear decklid 24 is raised in a reverse pivoting manner. A reverse pivot decklid has a rear edge 25 that is connected to the vehicle by a hinge that permits the decklid to pivot in the area of the rear edge 25. Cut-outs 26, or clearance slots, are provided in the front portion of the decklid 24 that receive the buttress panels 18. The front edge 27 of the rear decklid is raised to allow for the retraction of the retractable hardtop assembly 12 to a storage position below the rear decklid 24 in a storage compartment 29. As the decklid 24 is raised and lowered, the cut-outs 26 allow the decklid 24 to pass by the buttress panels 18. Also shown in FIG. 1 is a rear rail 28 that extends upwardly from a rear rail pivot bracket 30 to the main roof panel 14 as will be more specifically described below. An upper end 35 of the rear rail 28 is attached to the main roof panel 14 and a lower end 37 of the rear rail is pivotally secured to the pivot bracket 30.

Figure 2:
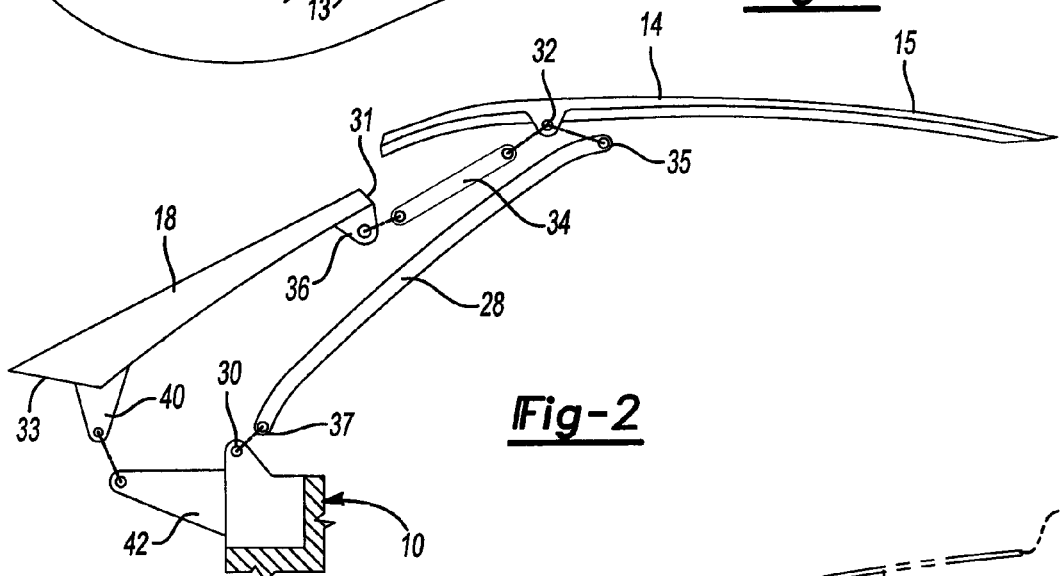
FIG. 2 is a side elevation schematic view showing the links of the retractable hardtop kinemat separated from each other.

Referring to FIG. 2, the links of the kinemat for the retractable hardtop assembly 12 are shown disconnected from their respective pivot locations to be more easily viewed. A roof pivot boss 32 is provided on the main roof panel 14. The roof pivot boss 32 is inset toward the front of the vehicle 10 from the rear edge of the main roof panel 14. A buttress-to-roof link 34 extends from the roof pivot boss 32 to a buttress pivot boss 36. The buttress pivot boss 36 is provided near the upper end 31 of the buttress panel 18. The buttress-to-roof link 34 is slightly shorter than the distance between the main roof panel 14 and the roof pivot boss 32. A buttress bracket 40 extends downwardly from the lower end 33 of the buttress panel 18 when the roof is in its extended position, as shown in FIG. 2. A main pivot bracket 42 is disposed at a location that is rearward of the rear rail pivot bracket 30. The buttress bracket 40 and main pivot bracket 42 are secured together at a pivot point. The rear rail pivot bracket 30 and main pivot bracket 42 are both grounded to the vehicle 10.

Figure 3:
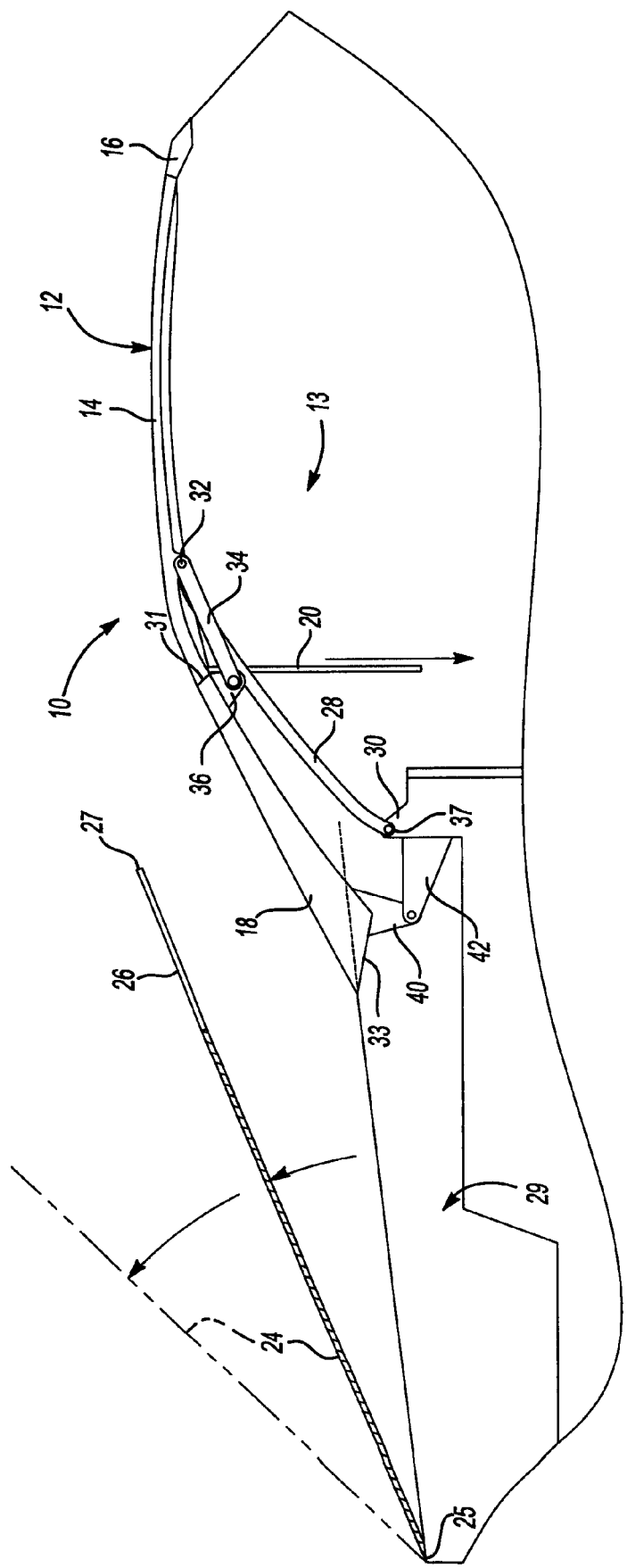
FIG. 3 is a fragmentary side elevation view of the retractable hardtop made in accordance with one embodiment of the present invention with the retractable hardtop in its extended position.

Referring to FIGS. 3-6, the retractable hardtop assembly 12 is shown as it is retracted in a series of positions beginning with the extended roof position shown in FIG. 3. The roof is retracted progressively in FIGS. 4 and 5, and in FIG. 6 the roof is shown fully retracted. It should be understood that the process for extending the roof requires a mere reversal of the progression shown.

In FIG. 3, the vehicle 10 is shown with a retractable hardtop assembly 12 in its extended position covering the passenger compartment 13. The main roof panel 14 is secured to the windshield header 16 on its front end 27. Buttress panels 18 abut the main roof panel 14 on their upper ends 31. The buttress-to-roof links 34 extend from the buttress pivot bosses 36 to the roof pivot bosses 32 in a nearly horizontal orientation. The buttress-to-roof link 34 and rear rail 28 are nearly parallel, as shown in FIG. 3. The buttress panel 18 extends primarily rearwardly and also downwardly to the rear decklid 24 on the lower end 33 of the buttress panel 18. The rear decklid 24 is shown in phantom in FIG. 3 to illustrate its raised position. The rear decklid 24 is raised to permit the retractable hardtop assembly 12 to be stowed under the rear decklid 24 in the storage compartment 29 and to be moved to an extended position above the passenger compartment 13. The buttress bracket 40 extends vertically downwardly to the main pivot bracket 42 and is pivotally connected to the pivot bracket 42. An arrow is shown next to the active rear window 20 to illustrate lowering the active rear window 20 during the extension and retraction cycle. The active rear window 20 may be raised to provide a wind deflector panel behind the vehicle occupant after the top is retracted. The rear window may be independently lowered to provide ventilation when the top is up, or to provide a full convertible appearance when the hardtop is retracted.

Figure 4:
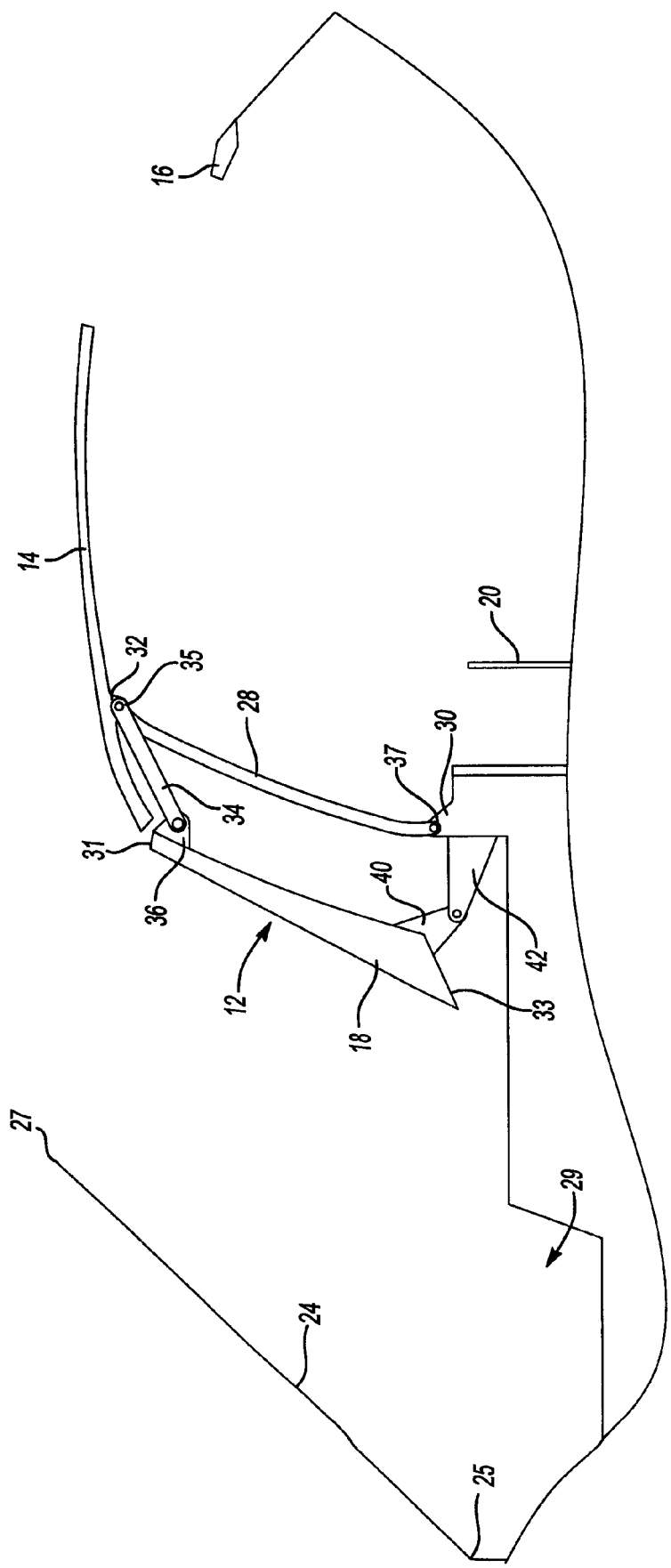
FIG. 4 is a fragmentary side elevation view of the embodiment of the retractable hardtop shown in FIG. 3 in an early partially retracted position.

Referring to FIG. 4, the retractable hardtop assembly 12 is shown in a partially retracted position wherein the retractable hardtop assembly is approximately 25% to 30% retracted. The main roof panel 14 is shifted rearwardly from the windshield header 16. The rear rail 28 and buttress panel 18 are rotated in a counter-clockwise direction, as illustrated. The buttress-to-roof link 34 is rotated clockwise thereby increasing the distance between the top portion of the buttress panel and the rear rail 28. The active rear window 20 is shown in its lowered position. The rear decklid 24 is shown in its raised position to provide clearance for movement of the retractable hardtop assembly 12 into the trunk or storage compartment 29.

Figure 5:
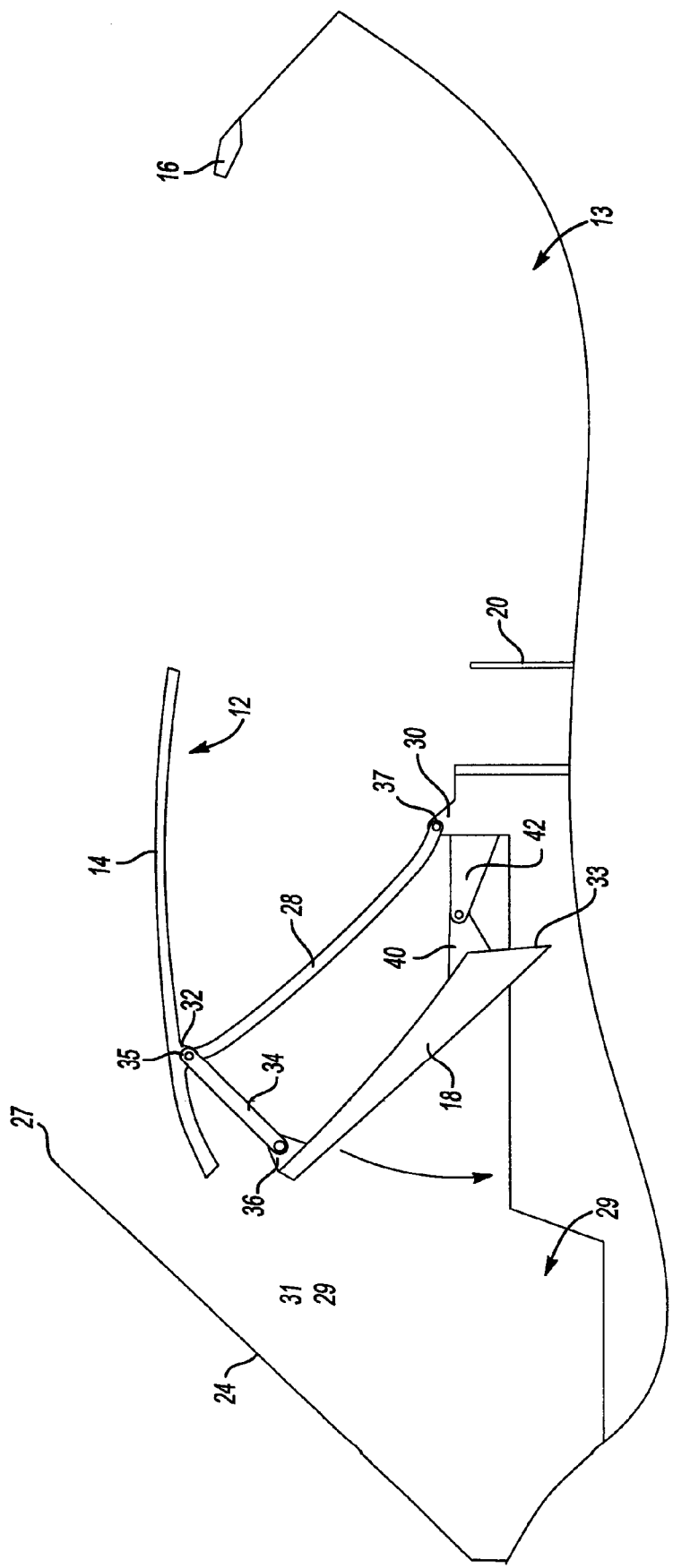
FIG. 5 is a fragmentary side elevation view of the embodiment of the retractable hardtop shown in FIG. 3 in a late partially retracted position.

Referring to FIG. 5, the retractable hardtop assembly 12 is shown in its nearly fully retracted position (approximately 60% to 70% retracted). In this position, the main roof panel 14 is still in its generally horizontal orientation with the rear rail 28 and buttress-to-roof link 34 being nearly perpendicular to the length of the rear rail 28. The buttress-to-roof link 34 is also nearly perpendicular in this position to the buttress panel 18. The buttress bracket 40 is connected to the main pivot bracket 42 with the buttress bracket 40 being disposed directly behind the main pivot bracket 42. As shown in FIG. 4, the active rear window 20 is in its lowered position and the rear decklid 24 is in its raised position.

Figure 6:
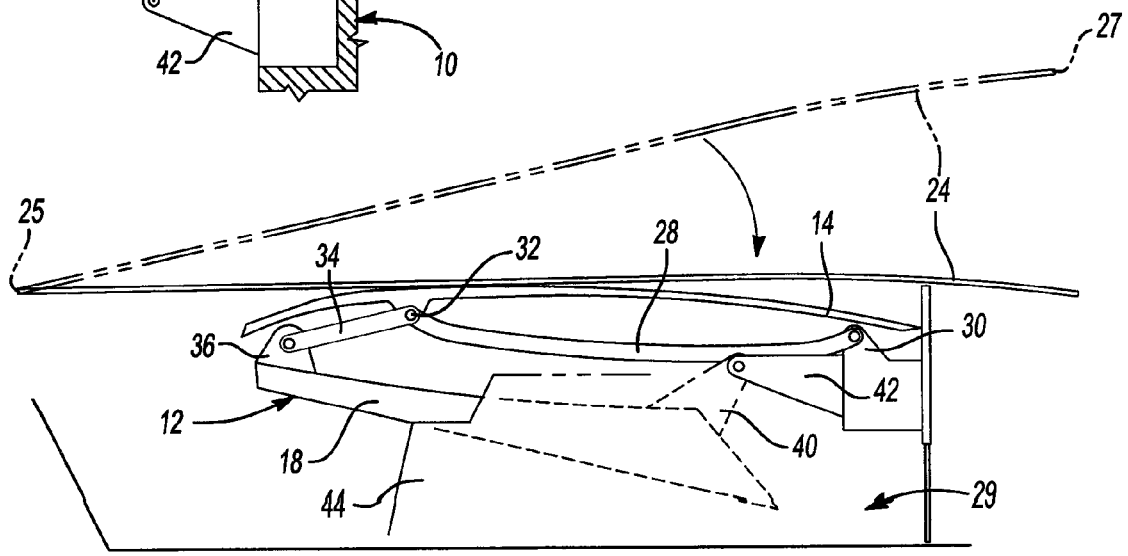
FIG. 6 is a fragmentary side elevation view of the embodiment of the retractable hardtop shown in FIG. 3 in the fully retracted position.

Referring to FIG. 6, the retractable hardtop assembly 12 is shown in its fully stowed position below the rear decklid 24. The rear decklid 24 is shown in phantom in its nearly closed position with an arrow indicating the movement of the rear decklid 24 to the closed position. In this position, the retractable hardtop assembly 12 is stored with the main roof panel 14 extending generally in its horizontal orientation with its top sides 15 up throughout the retraction cycle. The retractable hardtop assembly 12 is connected to the rear rail pivot bracket 30 by the rear rail 28 that extends nearly parallel to the main roof panel 14. The buttress-to-roof link 34 is also generally aligned with the rear rail 28. The buttress panel 18 is inverted with the buttress bracket 40 extending upwardly to the main pivot bracket 42.

As shown in FIGS. 6 and 7, the retractable hardtop assembly 12 may be provided on the vehicle 10 having a mid engine 44, a battery, or other bulky component centrally located between the lateral sides of the vehicle. The retractable hardtop assembly 12 could also be used to increase the storage space available in the center of the vehicle. Additional room is provided for the engine 44 between the buttress panels 18 and below the main roof panel 14 when the assembly 12 it is in the stowed position because there is no structure interconnecting the buttress panels 18 between the roof 14 and the main pivot bracket 42. Clearance is provided between the stored buttress panels 18 and links 28. The main roof panel 14 in the stored position generally is arranged as a bridge over the stored buttress panels 18 and links 28 which maximizes the space available between the engine 44 and the retractable hardtop assembly 12. The vertical space required for storage of the roof panel 14 is generally equivalent to the thickness of the roof panel 14.

The method of retracting the retractable hardtop assembly 12 will be described beginning with the decklid disposed below the buttress panels 18 and with the buttress panels 18 being received in clearance cut-outs 26 in the rear decklid 24. The clearance cut-outs 26 of the buttress panels 18 allow the rear decklid 24 to be raised to start the retraction process. Once the rear decklid 24 is raised, the rear window is lowered into the vehicle 10 by its associated window regulator. The roof panel 18 is unlatched from the windshield header 16. The linkage may be operated by a power cylinder (not shown) attached to the vehicle 10 that may engage the rear rail 28 or buttress panel 18, for example, and moves the roof panel 14 rearwardly in a generally horizontal orientation as shown in FIGS. 3, 4 and 5. The buttress panels 18 are rotated in the direction shown in FIGS. 1, 2 and 3 to an inverted position as shown in FIG. 6. During the retraction cycle, the buttress bracket 40 moves from a position in which it extends rearwardly from the main pivot bracket 42 to a retracted position in which the buttress bracket 40 extends downwardly from the main pivot bracket 42. The buttress-to-roof link 34 is moved during the retraction cycle from a position extending forward from the buttress panel 18 to a retracted position in which the buttress-to-roof link 34 extends forwardly from the inverted buttress panels 18. The front edge of the rear decklid 24 is then pivoted downwardly to be seated against the body of the vehicle 10.

The procedure for extending the roof to its extended, or covering, position begins by initially raising the decklid 24 on its rear hinge to provide clearance for the retractable hardtop assembly 12. A power cylinder (not shown) may pull the rear rail 28 or buttress panel 18 toward the front of the vehicle. This movement causes the roof panel 14 to be moved forward in a generally horizontal orientation towards the windshield header 16. The buttress panels 18 rotate from their inverted position as shown in FIG. 6 to the position shown in FIGS. 1 and 3. After the buttress panels 18 and roof panel 14 are moved to the position shown in FIG. 3, the rear decklid 24 pivots on the rear hinge so that the front edge of the decklid 24 moves from a position above the buttress panels 18 to a position adjacent the bottom of the buttress panels 18. The buttress panels 18 press through the cut-outs 26 in the decklid 24 as the decklid 24 is lowered.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable hard top for a vehicle, the vehicle having a decklid that covers a rear compartment of the vehicle and is pivoted between an open position and a closed position on a rear edge of the decklid, wherein the decklid has a pair of clearance slots, the retractable hard top comprising:
   a roof panel spanning a passenger compartment of the vehicle and extending longitudinally from a windshield header to a rear window and transversely across the vehicle;
   a pair of buttress panels projecting rearwardly of the rear window at a lower end extend through the clearance slots of the decklid and are provided on opposite sides of the roof panel, wherein each buttress panel is pivotally attached to the vehicle on the lower end;
   a pair of buttress-to-roof links pivotally attached to the roof panel;
   a pair of rear rails that are provided on opposite sides of the roof panel, wherein each rear rail is pivotally connected to the vehicle on a lower end at a location that is spaced from the point at which the buttress panel is attached to the vehicle and is pivotally attached on an upper end where the buttress-to-roof link is attached to the roof panel;
   a rear window that is shifted from a closed position in which the window extends from the roof downwardly to the vehicle and an open position in which the rear window is retracted downwardly into the vehicle; and
   wherein as the decklid is raised the clearance slots allow the front edge of the decklid to move from a position adjacent to the bottom of the buttress panels to a position above the buttress panels, the rear window being retracted from the closed position to the open position, the buttress panels being pivoted about the lower ends thereof rearwardly to an inverted position, and the roof panel being pivoted relative to the upper end of the buttress panels to a storage position extending between and above the buttress panels.

2. The retractable hard top of claim 1 wherein a four bar link is defined on each side of the vehicle by the buttress panel, the buttress-to-roof link, the rear rail and a pivot bracket to which the lower end of the buttress panel and the lower end of the rear rail are attached at spaced locations.

3. The retractable hard top of claim 1 wherein the vehicle has an engine assembled to the vehicle at a location that is rearward of the passenger compartment and the roof is stored in the storage position above the engine and the buttress panels are stored on opposite lateral sides of the engine.

4. The retractable hard top of claim 1 wherein the rear window may be shifted to the closed position when the roof panel is in the storage position.

5. A retractable hard top system for a vehicle comprising:
a one-piece roof panel having a top side;
an active rear window that engages the roof panel in a closed position and is retracted into the vehicle in an open position;
a pair of four bar linkages on opposite lateral sides of the vehicle including right and left buttress panels projecting rearwardly of the rear window at a lower end, right and left rear rails; right and left buttress-to-roof links, a main pivot bracket pivotally connected to the buttress panels at a main pivot, and a rear rail pivot bracket pivotally connected to the rear rails at a rear rail pivot, wherein the four bar linkages move the roof panel between an extended position and a stored position, wherein the buttress panels and the rear rails are inverted as they move between the extended and retracted positions and the top side of the roof panel remains in the same top side up orientation as the top is moved between the extended and retracted positions.

6. The retractable hard top system of claim 5 wherein the buttress panels in the stored position are disposed below the roof panel and on opposite lateral sides of the roof panel.

7. The retractable hard top roof system of claim 5 wherein the buttress panels are received in cut-outs formed in the decklid when the roof is in the extended position.

8. The retractable hard top roof system of claim 5 wherein the decklid is raised relative to the buttress panels to provide access to the storage area that is opened when the decklid is raised, and wherein the buttress panels are received in cut-outs formed in the decklid when the roof is in the extended position.

9. The retractable hard top roof system of claim 5 wherein the roof panel is moved from the extended position in which a front edge of the roof panel is secured to a windshield header of the vehicle to the retracted position in which the front edge of the roof panel is disposed rearward of the active rear window.

10. The retractable hard top roof system of claim 5 wherein the main pivot bracket is spaced below and rearward of the rear rail pivot bracket when retracted.

11. The retractable hard top roof system of claim 5 wherein the buttress-to-roof links are pivotally connected to the buttress panels at a buttress pivot and the roof panel at a roof pivot, and the distance between the main pivot and a rear rail pivot is equal to the distance between the buttress pivot and the roof pivot.

12. The retractable hard top roof system of claim 5 wherein the buttress-to-roof link extends forward of the buttress panel when the roof is in the extended position and is pivotally connected to the roof panel, wherein the buttress-to-roof link is pivotally connected to the buttress panel and the roof panel at spaced connection points that are spaced apart a distance is equal to the distance between the main pivot and the rear rail pivot.

13. The retractable hard top roof system of claim 5 wherein the buttress panel is connected on opposite ends to the main pivot bracket by a buttress bracket and by a buttress pivot to the buttress-to-roof link, the buttress-to-roof link is pivotally connected on opposite ends to the buttress pivot and to the roof by a roof pivot, the rear rail is connected on opposite ends to the roof pivot and a rear rail pivot, and the rear rail pivot bracket is fixed relative to the main pivot bracket.

14. The retractable hard top roof system of claim 5 wherein the roof panel, the rear rail, and the buttress-to-roof link are disposed below the decklid and above the buttress panel and the main pivot bracket when the roof is in the stored position.

15. The retractable hard top system of claim 5 wherein the active rear window may be shifted to the closed position when the roof panel is in the stored position.

16. The retractable hard top system of claim 5 wherein the vehicle has an engine that is assembled to the vehicle behind a passenger compartment and the roof panel is stored in the stored position above the engine and the buttress panels are stored on opposite lateral sides of the engine.

17. A retractable hard top for a vehicle comprising:
a roof panel spanning a passenger compartment of the vehicle and extending longitudinally from a windshield header to a rear window and transversely across the vehicle;
a pair of buttress panels projecting rearwardly of the rear window at a lower end are pivotally connected to opposite sides of the roof panel and each buttress panel is pivotally attached to the vehicle on the lower end, and wherein the pair of buttress panels are not interconnected by any part of the retractable hard top at the lower portion of the buttress panels to the location where the buttress panels are attached to the vehicle;
a pair of rear rails are provided on opposite sides of the roof panel, wherein each rear rail is pivotally connected to the vehicle on a lower end at a location that is spaced from the point at which the buttress panel is attached to the vehicle and is pivotally attached on an upper end to the roof panel;
the rear window is shifted from a closed position in which the window extends from the roof downwardly to the vehicle and an open position in which the rear window is retracted downwardly into the vehicle; and
wherein clearance between the buttress panels in a stored position is provided by the lack of any interconnecting structure of the retractable hard top between the lower portions of the buttress panels to the location where the buttress panels are attached to the vehicle and below the roof panel which reduces the vertical space required for storage of the retractable hard top below the roof panel to the thickness of the roof panel.

18. The retractable hard top of claim 17 wherein the buttress panels in the stored position are disposed below and on opposite lateral sides of the roof panel which reduces the lateral space for storage of the retractable hard top below the roof panel to the width of the buttress panels with clearance being defined between the buttress panels.

19. The retractable hard top of claim 17 further comprising a pair of buttress-to-roof links pivotally attached to the roof panel on an upper end and pivotally attached to one of the buttress panels on a lower end.

20. The retractable hard top of claim 17 wherein the vehicle has an engine that is assembled to the vehicle behind the passenger compartment and the roof panel is stored in the stored position above the engine and the buttress panels are stored on opposite lateral sides of the engine.

* * * * *

UNITED STATES PATENT AND TRADEMARK OFFICE
CERTIFICATE OF CORRECTION

| | | |
|---|---|---|
| PATENT NO. | : 7,621,583 B2 | Page 1 of 1 |
| APPLICATION NO. | : 12/131440 | |
| DATED | : November 24, 2009 | |
| INVENTOR(S) | : Robert E. Fallis, III et al. | |

It is certified that error appears in the above-identified patent and that said Letters Patent is hereby corrected as shown below:

Column 7, Line 62-63, Claim 12:

After "spaced apart" insert -- at --

After "distance" insert -- which --.

Signed and Sealed this

Ninth Day of February, 2010

David J. Kappos
*Director of the United States Patent and Trademark Office*